United States Patent Office 3,544,361
Patented Dec. 1, 1970

3,544,361
PROCESS OF PRODUCING TIN OXIDE COATING
Albert Servais, Gosselies, Belgium, assignor to
Glaverbel S.A., Brussels, Belgium
Filed June 7, 1966, Ser. No. 555,787
Claims priority, application Luxembourg, June 25, 1965,
48,910
Int. Cl. C03c 17/22
U.S. Cl. 117—124
5 Claims

ABSTRACT OF THE DISCLOSURE

Applying to a solid substrate an anhydrous (organic solvent) solution of anhydrous stannous chloride, hydrolyzing the stannous chloride, drying the hydrolyzed stannous chloride and baking the dried thus-formed coating results in a more economical preparation of more uniform and clear transparent tin oxide coatings with improved electrical and optical properties.

---

The present invention relates to a process for forming tin oxide surface coatings on glass and other materials, and more particularly, to a process for rendering conductive the surfaces of insulating materials and materials produced thereby.

It has been known to form tin oxide surface coatings on glass by applying atomized solutions of tin compounds to the glass while it is at a temperature of about 600° C. so that tin oxide forms at the surface with evolution of gas. Generally, however, coatings formed in this way are translucent, light-diffusing coatings and it is only possible to form transparent tin oxide coatings if the gas which forms at the surface of the glass is forcefully blown away from the surface as it forms. This is an extremely difficult and expensive operation. It is therefore very hard to form uniform transparent tin oxide coatings by such prior processes. Moreover, the coatings produced tend to be pitted and to be nonuniform in thickness and chemical composition.

It has been found, however, that it is possible to provide a process which does not require the high temperatures necessary in the prior art processes, and which can be performed more easily and economically.

It is therefore a principal object of the present invention to provide a process for producing tin oxide surface coatings on glass and other materials which is free from the deficiencies of heretofore utilized processes.

It is yet a further object of the present invention to provide such a process for producing tin oxide surface coatings on glass and other materials which comprises application of a solution of anhydrous stannous chloride with subsequent hydrolysis, drying and baking.

It is still a further object of the present invention to provide coated surfaces of glass and other materials produced by such a process.

Still further objects and advantages of the process and products of the present invention will become more apparent from the following description of the invention which is more detailed.

The process according to the present invention of forming a tin oxide coating on a surface of glass or other material comprises applying to such surface a solution of anhydrous stannous chloride in an anhydrous organic solvent, hydrolysing or allowing the stannous chloride to hydrolyse by contact with a moisture-containing atmosphere, and drying and baking of the thus formed coating.

It is relatively easy to form tin oxide coatings by the process of the present invention. The process can be performed in very simple and inexpensive apparatus since it is not necessary to employ high temperatures during the application of the coating, and in fact, the coating can be applied at room temperature. The thickness of the coating can easily be controlled by adjusting the concentration and quantity of the solution applied to the surface. It can thus be appreciated that when employing ordinary or moderate temperatures, it is much easier to maintain a uniform condition than it is in the case of the prior art processes. In fact, it is possible, by performing the process of the present invention, as will hereafter be described, to produce uniform and clear transparent coatings on pieces of material of large size without difficulty.

The present invention can be employed for coating sheet glass cut for use in glazing units or for coating sheet glass which has subsequently to be cut into smaller pieces, e.g., pieces to be used in glazing units or as instrument dial glasses. In such cases, the forming of uniform coatings on large blanks allows production costs to be further reduced, not only because the number of operations is reduced, but also because the number of rejects can be kept very small or even reduced to nil.

In addition to the coating of glass surfaces by the process of the present invention, such insulating surfaces as enamel and other vitreous surfaces, as well as plastic materials, e.g., polyethylene, polyvinylchloride, etc., can be advantageously coated. Moreover, the process can be utilized to produce the tin oxide coatings on metal surfaces, natural or synthetic rubbers, and various other materials.

A further advantage of the invention is that a much wider choice of additives for application in conjunction with the tin compound is possible. It is thus to be understood that the solution applied to the surface to be coated may contain one or more compounds addition to the anhydrous stannous chloride. This means that impurities need not be excluded and, in fact, one or more additional compounds may be deliberately included in the applied solution, e.g., a compound which becomes converted into an oxide of another metal.

The anhydrous stannous chloride solution may be applied, e.g., by spraying the solution onto the article or piece to be coated, or by dipping the article or piece into a body of the solution, in which latter case different faces of an article or piece, e.g., opposite faces of a sheet, may be simultaneously coated.

The quality of the coating formed by the process according to the invention is influenced by various factors, particularly the temperature prevailing where deposit of the anhydrous solution occurs, and the moisture content of the atmosphere in which the hydrolysis takes place. These factors should be correctly adjusted as will hereafter be explained, if it is desired to obtain a coating which is uniform in thickness and texture. The process according to the invention can be applied for forming tin oxide coatings for various purposes, e.g., tin oxide coatings on glass for forming semi-conductive and/or transparent coatings capable of reflecting radiation in a particular part of the light spectrum. The quality of the coating which must be achieved, as regards its homogeneity, its thickness, its composition, and its electrically conductive and optical properties, will in any given case depend on the intended subsequent use of the material.

In general, and with a view to forming coatings of uniform thickness, composition and texture, it is preferred to apply the anhydrous stannous chloride solution in an atmosphere with a temperature of from 25° to 35° C. While it may, in many cases, be possible to obtain coatings of adequate quality outside these temperature limits, they are recommended because, if too high a temperature prevails, the solvent tends to evaporate too quickly from the applied layer and, if the temperature is too low, stannous chloride may possibly evaporate before the tin is fixed by the hydrolysis reaction.

The moisture content of the atmosphere during the hydrolysis is preferably less than 60%. In tests with higher moisture contents, the surfaces subjected to the coating treatment were found to be exposed at certain spots. This was presumably due to the hydrolysis reaction occurring at such a high velocity that tin oxide became formed and deposited at the surface of the coating before evaporation of underlying solvent, with the result that the tin oxide subsequently became displaced by the evolving vapor during the heat treatment. In the coated areas, the coatings tended to be cloudy and of varying thickness.

The baking is preferably performed at a temperature of from 380 to 480° C. if the degree of electrical conductivity is an important factor. If this condition is observed, the process according to the present invention enables the production of tin oxide coatings having a higher conductivity for a given thickness than coatings obtained by the prior art processes. This advantage is particularly noted when baking in the region of 435° C. This is apparently due to the fact that in the structure of the layer monovalent chloride ions are replaced by negative bivalent oxygen ions. Coatings baked at temperatures above 480° C. or below 380° C. have been found to have lower electrical conductivity. This is probably due to the fact that at the higher temperatures, defects due to the replacement of chloride ions by oxygen ions in the structure no longer occur, whereas, at the lower temperatures, the dehydration whereby the temporarily formed hydroxides become converted is not completed, or is not sufficient.

Additional objects and advantages of the present invention will become apparent upon consideration of the following description when taken in conjunction with the accompanying drawings in which.

Figure 1:
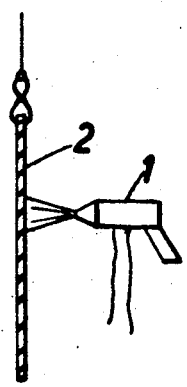
FIG. 1 is a schematic view showing the application of anhydrous stannous chloride solution by atomizing.

As shown by FIG. 1, the anhydrous solution can be atomized and directed by means of a spray gun 1 onto a surface of a piece 2 to be coated, e.g., a sheet of glass. The piece is maintained at a temperature below the boiling point of the solution. In the illustrated example, the surface to be coated is placed vertically but it could similarly be placed in a horizontal position. The solution can be applied uniformly over the surface to be coated, or the solution can be applied more liberally on certain areas than on others in order to form a coating of which the thickness gradually varies along the sheet, or varies over the sheet area in other ways in order to achieve special effects.

Figure 2:
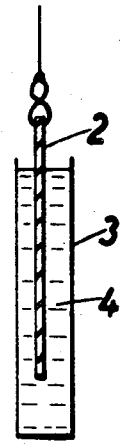
FIG. 2 is a schematic view showing the application of the solution by dipping.

In the alternative method of applying the solution represented in FIG. 2, a sheet 2 (e.g., a sheet of glass) is dipped into a vessel 3 containing stannous chloride solution 4, and the sheet is then withdrawn. The speed of withdrawal influences the thickness of the coating. Similarly, whether the coating is of uniform thickness or not over the area of the sheet depends on whether and in what manner, the speed of displacement of the sheet varies (if at all) during its withdrawal. Consequently, by appropriately controlling the speed of the sheet during withdrawal, the sheet may be provided with a coating which is of uniform thickness or varies in thickness in a predetermined manner. If it is desired to coat only one face of a sheet, or to coat one or both faces only in certain areas, this can also be done by the dipping technique if the surface area or areas not to be coated are protected by a varnish which can be subsequently easily removed.

As an example of the performance of the invention, a glass sheet can be coated with tin oxide on both faces to form electrically conductive coatings preventing the accumulation of electrostatic charges on the surfaces of the sheet such as could otherwise occur due to the insulating properties of the glass. If special optical effects are not required, the oxide coatings are preferably at least 50 millimicrons thick and thus noninferential and neutral, i.e., grey, with respect to incident light. The required uniformity and thickness of the coatings is achieved by appropriate choice of the speed at which the glass sheet is withdrawn from the solution and of the concentration of the solution 4. If the speed of withdrawal is too high, the applied solution does not form a coating which is in equilibrium under the forces acting upon it immediately after withdrawal of the sheet from the dipping tank, and the solution flows down under gravity after complete withdrawal of the sheet with the result that the coatings become thinner at the top of the sheet and thicker at he bottom. On the other hand, if the speed is too low, too much solution flows off the sheet as it is withdrawn and the final coating is too thin and its resistance to the passage of an electric current is too great. The concentration of the solution influences the result in the sense that, other things being equal, a conductive coating of greater thickness can be formed by increasing the concentration of the solution, although, of course, the extent to which the concentration can be increased is limited by reason of viscosity considerations. A suitable solution is one obtained by dissolving anhydrous stannous chloride in absolute ethyl alcohol, or other alcohol or ketone solvent, etc., in the proportion of about 25 gr. per litre, although much lower i.e., 5–10 gr. per litre or much higher, i.e. 75–100 gr. per litre, can be advantageously utilized where desired.

In general, withdrawal speeds of the order of 0.5 cm./sec. are suitable, although greater or lesser speeds can be advantageously utilized where desired. It is emphasized that all of these variables can vary over a wide range depending on the nature of the coating that is desired.

Figure 3:
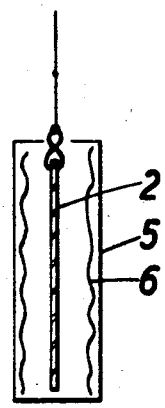
FIG. 3 is a schematic view showing the subsequent treatment of the coated material.

The solution 4 is suitably at a temperature of about 30° C. The sheet 2 is withdrawn from the solution at a very uniform speed into a humid atmosphere and the glass sheet is then dried for a few minutes at a temperature of about 100° C. and then heated for about 5 minutes at a temperature of approximately 435° C. The drying and the baking steps are preferably performed in different furnaces which may, however, be similar, e.g., like the furnace 5 which is represented in FIG. 3, and which has radiant heating elements 6 fitted to its interior vertical walls. However, the drying and the baking of the coatings can be performed in a single furnace run first at drying and then at baking temperature.

By proceeding as described above, coatings with specific electrical resistivities of from 10,000 to 100,000 ohm per square have been obtained, the actual value in each case depending on the particular conditions observed. By choosing conditions other than those which have been so far employed, e.g., coating solutions of different compositions and different concentrations, resistivities above and below the said range will be attainable. Glass coated to impart antistatic properties can be used with advantage, e.g., for the dial glasses of precision instruments where the existence of static charges is objectionable due to the attraction of dust and the disturbance of readings due to the influence of the charges on sensitive mobile elements, such as indicator needles. The coatings need have no material effect on the optical properties of the glass apart from a possible slight increase or decrease in its light-reflecting properties.

Also, a tin oxide coating can be formed by a process according to the present invention on a previously formed coating or coatings of the same or some other composition and such is intended to be included within the scope of the present invention.

EXAMPLE I

A glass sheet was coated on both faces by dipping in an anhydrous ethyl alcohol solution containing 25 gr. per litre anhydrous stannous chloride. The coating solution was maintained at 30° C. After allowing contact for a short period of time, i.e. about 5 minutes, the sheet was withdrawn at a rate of about 0.5 cm./sec. and placed in a humid atmosphere having a moisture content of about 50%. After hydrolysis in the humid atmosphere, the coated glass sheet was dried at a temperature of about 100° C. for 3 minutes and baked for about 5 minutes at 435° C. The resulting coated glass sheet was found to have a very uniform adherent coating of tin oxide having an extremely good electrical resistivity.

It will be understood that the above description of the present invention is susceptible to various modifications, changes, and adaptations, and same are intended to be comprehended within the meaning and range of equivalents of the appended claims.

What is claimed is:

1. A process for forming a tin oxide coating on a solid substrate, which process comprises applying to the surface at a temperature of from 25° to 35° C. a solution of anhydrous stannous chloride in an anhydrous organic solvent, hydrolyzing the applied stannous chloride by contacting the same with a humid atmosphere having a moisture content of less than 60%, drying the hydrolyzed stannous chloride and then baking the thus-formed dried coating at a temperature of from 380° to 480° C.

2. A process according to claim 1 wherein te drying is effected at a temperature of about 100° C.

3. The process of claim 1 wherein the stannous chloride solution is applied by dipping.

4. A process of claim 1 wherein the stannous chloride solution is sprayed onto the surface to be coated.

5. The process of claim 1 wherein the surface coated is a glass sheet.

References Cited
UNITED STATES PATENTS

| | | | |
|---|---|---|---|
| 2,567,331 | 9/1951 | Gaiser et al. | 117—124 |
| 2,613,302 | 10/1952 | Gurewitsch | 117—211 |
| 2,772,654 | 12/1956 | Herkart | 117—211 X |
| 3,005,731 | 10/1961 | Payne | 117—211 |
| 2,957,787 | 10/1960 | Koller | 117—211 |

ALFRED L. LEAVITT, Primary Examiner

W. F. CYRON, Assistant Examiner

U.S. Cl. X.R.

117—211